United States Patent
Kindred

(10) Patent No.: US 8,425,756 B2
(45) Date of Patent: Apr. 23, 2013

(54) APPARATUS AND METHOD FOR PRODUCING ELECTROLYZED WATER

(75) Inventor: Douglas Wayne Kindred, Kennesaw, GA (US)

(73) Assignee: Electric Aquagenics Unlimited, Kennesaw, GA (US)

(*) Notice: Subject to any disclaimer, the term of this patent is extended or adjusted under 35 U.S.C. 154(b) by 211 days.

(21) Appl. No.: 11/245,495

(22) Filed: Oct. 7, 2005

(65) Prior Publication Data

US 2006/0076248 A1    Apr. 13, 2006

Related U.S. Application Data

(60) Provisional application No. 60/617,159, filed on Oct. 8, 2004.

(51) Int. Cl.
*C02F 1/46*    (2006.01)

(52) U.S. Cl.
USPC ............ 205/743; 204/228.1; 204/228.6; 204/229.8

(58) Field of Classification Search .......... 204/228.1, 204/228.6, 229.8; 205/743
See application file for complete search history.

(56) References Cited

U.S. PATENT DOCUMENTS

| | | | | |
|---|---|---|---|---|
| 4,767,511 A | * | 8/1988 | Aragon | 210/743 |
| 5,445,722 A | * | 8/1995 | Yamaguti et al. | 204/228.6 |
| 5,807,473 A | * | 9/1998 | Sadler et al. | 205/743 |
| 6,106,691 A | * | 8/2000 | Nakamura et al. | 205/701 |
| 6,296,744 B1 | | 10/2001 | Djeiranishvili et al. | |
| 6,337,002 B1 | * | 1/2002 | Kashimoto | 204/228.6 |
| 6,528,214 B1 | | 3/2003 | Pliner et al. | |
| 6,610,249 B1 | | 8/2003 | Hinze | |
| 6,632,347 B1 | | 10/2003 | Buckley et al. | |
| 2005/0126928 A1 | | 6/2005 | Hung et al. | |
| 2005/0173262 A1 | * | 8/2005 | Nakanishi et al. | 205/743 |

* cited by examiner

*Primary Examiner* — Arun S Phasge
(74) *Attorney, Agent, or Firm* — Bracewell & Giuliani LLP

(57) ABSTRACT

An apparatus for producing electrolyzed water includes an electrochemical cell and a solution reservoir containing a solution and having an outlet. An injection pump has an input end in fluid communication with the outlet of the solution reservoir and an output end in fluid communication with the electrochemical cell, wherein the injection pumps an amount of the solution from the solution reservoir to mix with a water solution and enter the electrochemical cell. A current feedback sensor senses a cell current in the electrochemical cell. A current control unit in data communication with the current feedback sensor and the injection pump wherein the current control unit compares the cell current with a preselected current and adjusts the amount of solution pumped from the injection pump responsive to the comparison. The apparatus may also include an automatic control feedback system to monitor and adjust pH.

18 Claims, 3 Drawing Sheets

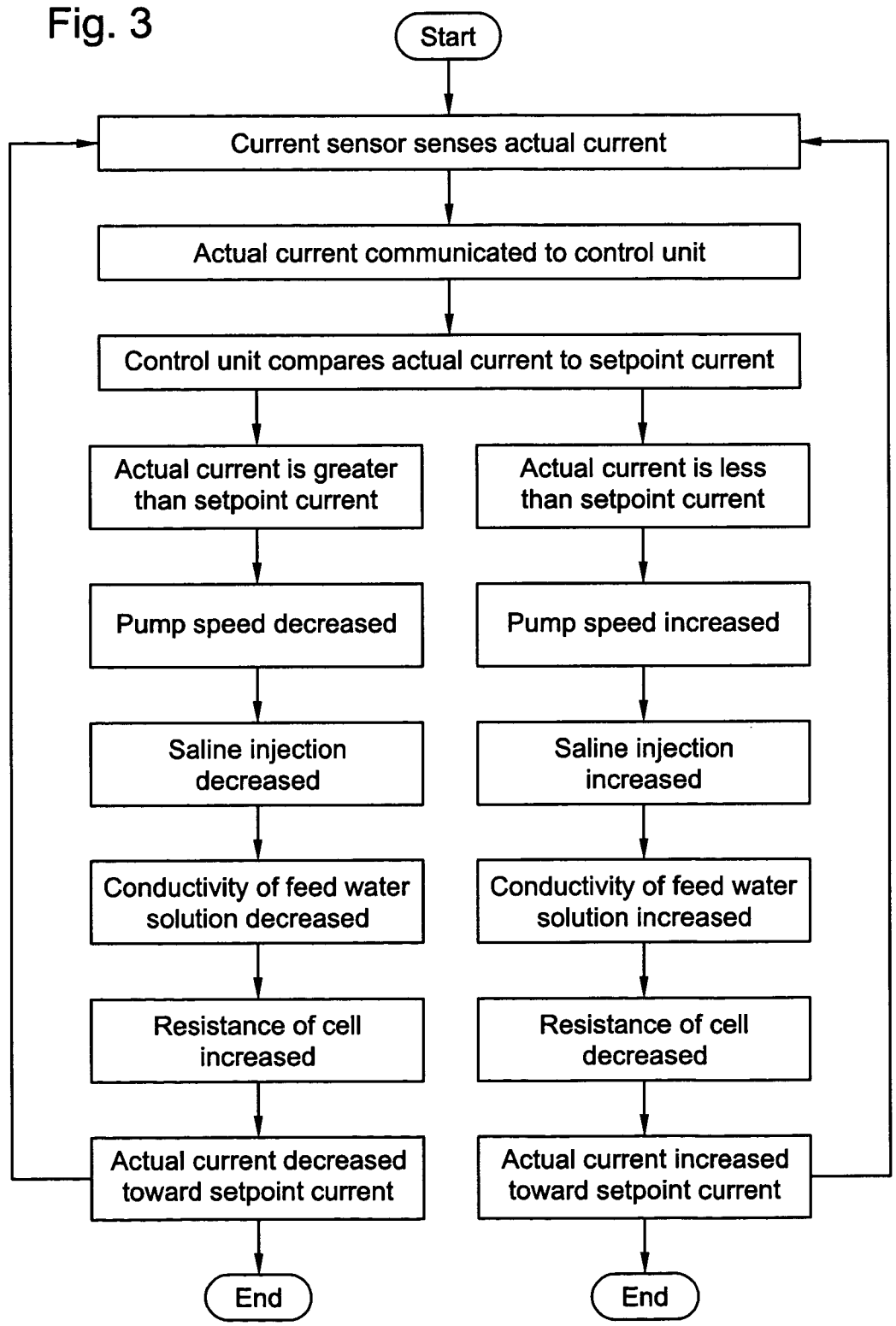

APPARATUS AND METHOD FOR PRODUCING ELECTROLYZED WATER

RELATED APPLICATIONS

This application claims the benefit under §119(e) of U.S. Provisional Application Ser. No. 60/617,159, filed on Oct. 8, 2004, which is hereby incorporated by reference in its entirety.

FIELD OF THE INVENTION

The invention relates generally to an apparatus and method for producing stabilized electrolyzed water, and more particularly to a system that includes a control feedback loop responsive to a predetermined optimum current to control cell water quality output.

BACKGROUND OF THE INVENTION

Electrolyzed oxidizing (EO) water has been conventionally produced. Electrolyzed water is classified into three types: acidic electrolyzed water (germicidal, used for hygienic purposes), alkaline ionized water (having medical effects; drinking water), and alkaline electrolyzed water (lipid-detergent). Acidic electrolyzed water is used to sanitize food-processing equipment and fresh-cut vegetables in food industries, because of its great potential for food-related and other disinfecting processes due to its high bacterial activity.

Acidic EO water is normally generated from the anode electrode through electrolysis of a dilute aqueous NaCl solution. The $Cl^{-1}$ ions are electrochemically oxidized to $Cl_2$ gas on the anode surface, which gas is partially hydrolyzed to hypochlorous acid (HOCl) in solution phase and to other ions. The relatively high batericidal activity of the acidic EO water is attributed to so-called active chlorine which comprises dissolved $Cl_2$, $OCl^-$, and HOCl, and is also attributed to the high oxidation-reduction potential (ORP) of the acidic EO water. However, the dissolved $Cl_2$ is readily evaporated or otherwise lost from the acidic EO water during storage or a treatment period, resulting in a loss of batericidal activity over time. This loss may also affect other important properties of EO water, such as its pH, ORP, and HOCl concentration, which should be known for proper use of the acidic EO water in a given service application.

Prior versions of electrolyzing devices include a system for producing electrolyzed oxidizing (EO) water wherein feed water solution including a saline solution component is supplied to an electrolytic cell comprising both an anode chamber and a cathode chamber. The feed water solution is cathodically electrolyzed in the cathode chamber to produce EO water as an antioxidant solution called alkaline catholyte. Catholyte is a mild alkaline solution with a pH range of 10.5 to 12.0 and ORP of −600 to −900 mV. The feed water solution is anodically electrolyzed in the anode chamber to produce EO water as an oxidant solution called anolyte, whose pH is modified in the process. Anolyte is a strong oxidizing solution with a pH range of 0.0-8.5 and an Oxidation-Reduction Potential (ORP) of +600 to +1200 mV.

It is desirable to have a preselected current maintained consistently in the electrochemical cell. Prior versions, however, had difficulties maintaining the current of the electrochemical cell at a current relatively close to the preselected current.

SUMMARY OF THE INVENTION

The invention includes an apparatus for producing electrolyzed water. The apparatus includes an electrochemical cell and a solution reservoir containing a solution and having an outlet. The invention also includes an injection pump having an input end in fluid communication with the outlet of the solution reservoir and an output end in fluid communication with the electrochemical cell, wherein the injection pumps an amount of the solution from the solution reservoir to mix with a water solution and enter the electrochemical cell. The apparatus also includes a current feedback sensor to sense a cell current in the electrochemical cell and a current control unit in data communication with the current feedback sensor and the injection pump wherein the current control unit compares the cell current with a preselected current and adjusts the amount of solution pumped from the injection pump responsive to the comparison.

Another embodiment of the apparatus includes an electrochemical cell having an input portion and an output portion and a solution reservoir containing a solution and having an outlet in fluid communication with an electrochemical call. The apparatus further includes a blend pump having an input end in fluid communication with a catholyte solution exiting the output portion of the electrochemical cell and an output end in fluid communication with the solution from the solution reservoir entering the electrochemical cell wherein the blend pump pumps an amount of the catholyte solution from the output portion of the electrochemical cell to mix with the solution entering the electrochemical cell. The apparatus further includes a pH feedback sensor to sense an output pH of an amount of solution exiting the electrochemical cell and a pH control unit in data communication with the pH feedback sensor and the blend pump, wherein the pH control unit compares the output pH with a preselected pH and adjusts the amount of catholyte solution pumped from the blend pump responsive to the comparison.

BRIEF DESCRIPTION OF THE DRAWINGS

FIG. 3 shows a diagram of the steps included in the method in accordance with the present invention.

DETAILED DESCRIPTION OF THE INVENTION

Although the following detailed description contains many specific details for purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations thereon, the claimed invention.

Figure 1:
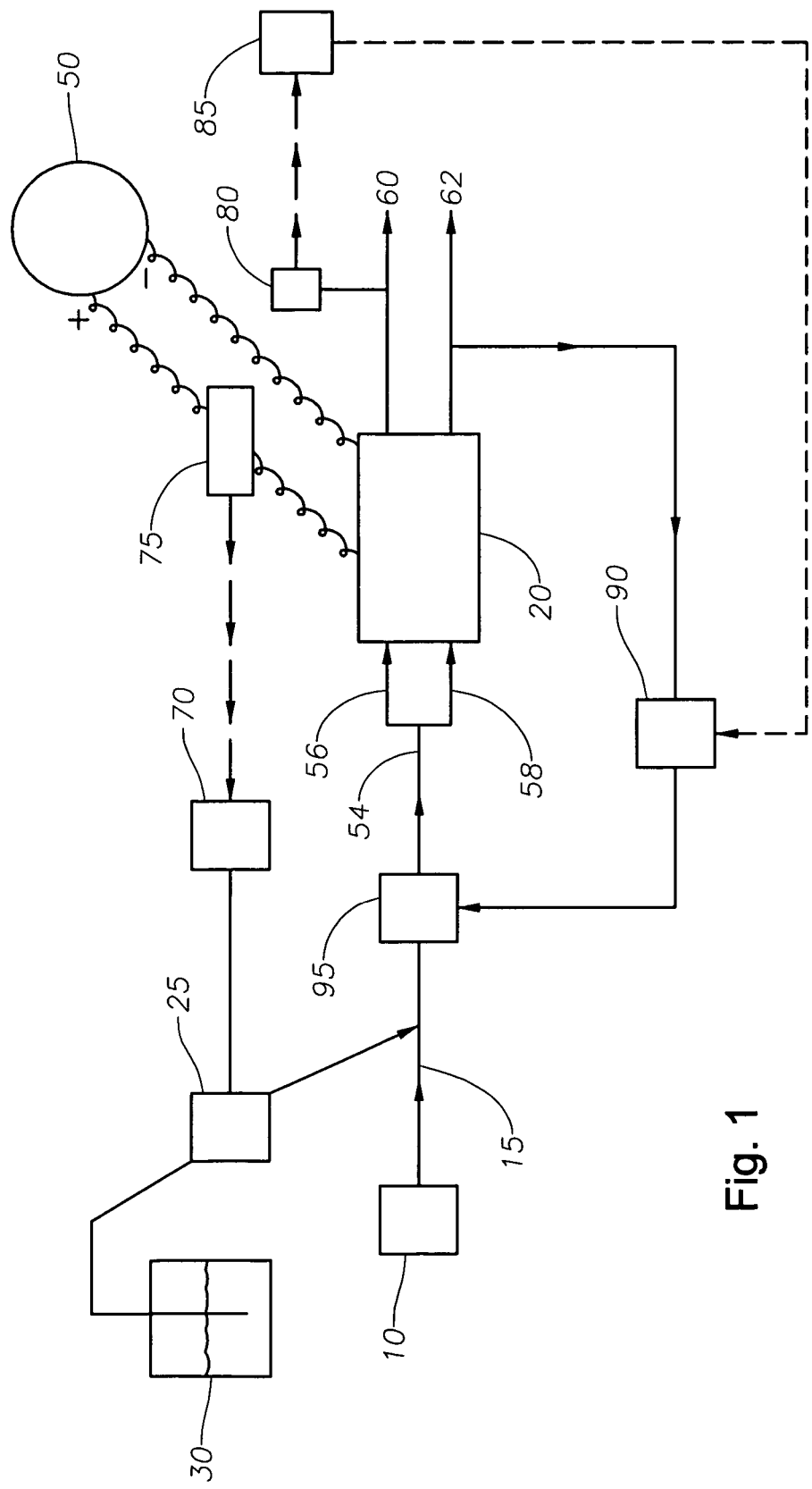
FIG. 1 shows a schematic diagram of the system in accordance with the present invention.

Referring to FIG. 1, water is provided from a water source 10 into a flow line 15 that supplies the water to a conventional EO water electrochemical cell 20. A variable speed injection pump 25 receives an aqueous solution from a solution reservoir 30 comprising, for example, a dilute sodium chloride (NaCl) solution. Alternatively, for example, hydrochloric acid, potassium chloride, magnesium chloride, and other salt compounds may be utilized in the solution reservoir 30.

The injection pump 25 pumps an amount of saline into the flow line 15 to mix with the water before entering the electrochemical cell 20, thus forming a feed water solution mixture to be electrolyzed. The feed water solution to be electrolyzed typically comprises a dilute aqueous NaCl solution, such as 0.01% to 25% by weight NaCl solution, although the invention can alternatively be practiced to electrolyze other aqueous solutions of KCl, $MgCl_2$ and other salts.

Figure 2:
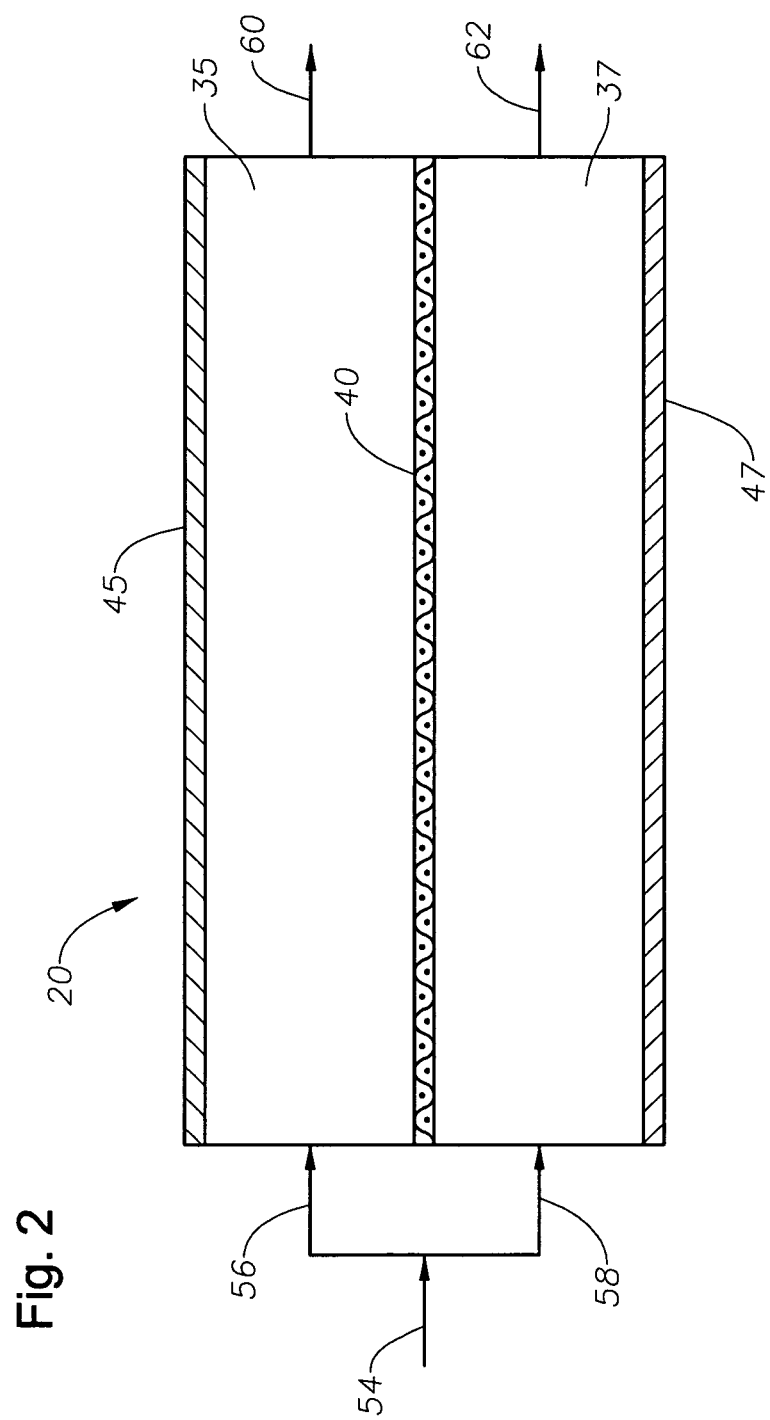
FIG. 2 shows a sectional view of the electrochemical cell of FIG. 1.

Referring to FIG. 2, an electrochemical cell 20 is formed by placing metallic electrodes 45, 47 into an electrolyte where a chemical reaction either uses or generates an electric current. The form of electrochemical cell 20 utilized in the invention is one in which an externally supplied electric current is used to drive a chemical reaction that would not occur spontaneously.

Electrochemical cell 20 includes a plurality of anode chambers 35 and cathode chambers 37 (only one shown) separated by a membrane 40. One or more flat plate-like anode electrodes 45 and cathode electrodes 47 (one of each electrode shown) are disposed in the anode chambers 35 and cathode chambers 37, respectively. The anode and cathode electrodes 45, 47 can comprise titanium or titanium coated with a precious metal, such as platinum, or alternatively any other suitable electrode material. The cell electrodes 45, 47 preferably have a fixed surface area. The membrane 40 can comprise either a non-ion selective separator membrane comprising, for example, non-woven polyester fabric, or an ion selective permeable membrane comprising, for example, a perfluorosulfonate ionomer. When the feed water solution to be electrolyzed comprises a dilute aqueous NaCl saline solution, the membrane 40 allows $Na^+$ ions to move toward the cathode electrode 47 from the anode chamber 35 and $Cl^-$ ions to move toward the anode electrode 45 from the cathode chamber 37. The membrane 40 is spaced between the electrodes by electrically insulating plastic spacers. The electrodes 45, 47 are connected to a conventional electrical power supply 50.

The feed water solution is supplied to both the anode chambers 35 and cathode chambers 37 via a feed water solution supply conduit 54 that is branched to have an anode supply conduit section 56 and cathode supply conduit section 58 from the common conduit 54. The anode supply conduit section 56 supplies the feed water solution only to anode chambers 35 via a manifold (not shown) that communicates with each of the plurality of anode chambers 35. The cathode supply conduit section 58 supplies the feed water solution only to cathode chamber 37 via a manifold (not shown) that communicates with each of the plurality of cathode chambers 37.

The feed water solution is cathodically electrolyzed in the cathode chambers 37 to produce EO water as alkaline catholyte. The feed water solution is anodically electrolyzed in the anode chambers 35 to produce EO water as anolyte whose pH may be modified or adjusted. The pH-modified anolyte is discharged from the anode chambers 35 by way of an anolyte discharge conduit 60 for collection and use. The catholyte is discharged from the cathode chambers 37 by way of a catholyte discharge conduit 62 for collection, and in some embodiments may be recycled back to the anode chambers 35.

The pH of the anolyte discharged by way of conduit 60 from anode chambers 35 is controlled to be above approximately 5, and preferably between about 5 to 6, in order to provide more stable bactericidal activity over time where the active chlorine concentration of the anolyte is generally constant at all pH values in that range. Some applications benefit from producing an EO acidic output water at a higher pH to reduce potential corrosion of some surfaces that will be cleaned and to provide a more stable solution to preserve its bactericidal activity over longer periods of time. The invention is capable of generating EO acidic water over a wide range of outlet pH through the use of an automated pH control loop which controls the amount of catholyte recirculated to the inlet of the cell. This automated pH control loop and the separate cell current control loop provide the ability to independently adjust the chlorine concentration and the pH. This allows the user to select a pH setpoint of between 5 and 6 where nearly 100% of the chlorine generated in the more stable form of HOCl, hypochlorous acid.

Referring to FIG. 1, the pH of the acidic EO output water is measured by a pH sensor 80 located in the anolyte discharge conduit 60, which provides feedback of actual pH to a pH controller 85. The controller 85 automatically adjusts the speed of a blend pump 90 to control the actual pH to the pH setpoint of the controller 85. The blend pump 90 is connected to output line 62 and discharges to a mixing chamber 95 wherein the recirculated catholyte is thoroughly mixed with the water from the water source 10 and the solution from reservoir 30. Sensor 80, pump 90, and mixing chamber 95 comprise the automated pH control loop.

The power consumed in the electrolytic cell 20 affects the properties of the EO water leaving the cell 20. The electrolytic cell 20 preferably operates in a flooded condition, which causes the cell 20 to act as a variable resistor. Thus, varying the conductivity of the water in turn varies the cell 20 resistance. If voltage from the power supply 50 is held constant, as it is in some embodiments, then varying the conductivity of the water in the cell 20 may control the power to the electrolytic cell 20.

Referring to FIG. 1, a control unit 70 controls the pump speed of the saline injection pump 25, and thus controls the relative amount of saline injected into the electrochemical cell 20. An automatic feedback control loop is included in the system, enabling the control unit 70 to adjust and optimize the amount of saline injected into the cell 20. The control unit 70 operates responsive to feedback information from a current sensor 75 located between the power supply 50 and the electrochemical cell 20. Current sensor 75 senses the current supplied by the power supply 50.

The control unit 70 is provided with a value for the optimum current setpoint, which is predetermined and independently established. The automatic feedback loop comprising current sensor 75, control unit 70, and pump 75 provides feedback data of the actual cell current detected by the current sensor 75 to the control unit 70, and the control unit 70 responds by comparing the actual cell current with the setpoint current to determine the proper adjustment to the speed of the injection pump 25.

In operation, power is supplied to the electrochemical cell 20 from the power supply 50. The pump 25 delivers the solution from the solution reservoir 30 to mix with the water and any fluid pumped from the blend pump 90 to mix therewith. The current sensor 75 provides a feedback signal of the actual cell current consumed by the electrochemical cell 20, and communicates the actual cell current information back to the control unit 70 through an automatic control feedback loop. The control unit 70 receives the feedback signal from the current sensor 75, and responds by comparing the amps of the actual cell current with the amps of the predetermined optimum setpoint current. If the actual cell current does not equal the setpoint current, the control unit 70 changes or adjusts the output signal to the saline injection pump 25 to vary the pump speed. If the actual cell current is greater than the setpoint current, the pump speed is decreased. If the actual cell current is less than the setpoint current, the pump speed is increased.

Varying the pump speed of the injection pump 25 accordingly varies the amount of saline injected into the electrochemical cell 20, and as a result changes the conductivity of the feed water solution that enters the cell 20. The corresponding change or adjustment in conductivity will result in an adjustment of the resistance in the electrochemical cell 20, and thus will result in an adjustment of the actual cell current toward the setpoint current. Such a feedback control system continues indefinitely until the actual cell current adjusts to become substantially equal to the predetermined optimum setpoint current, in order to ultimately optimize water quality output from the electrochemical cell 20.

The invention has several important advantages. The automatic current control feedback loop controls the electrochemical cell by automatically adjusting the conductivity of the water fed to the cell. Further, the system automatically adjusts the amount of chlorine generated to achieve the desired chlorine level. Further, the pH of the EO acidic output water may be automatically controlled by the pH feedback loop responsive to comparisons between the actual pH of the cell current and a predetermined optimum setpoint pH. The combination of these two automated control loops allows independent adjustment of HOCl and pH to allow the output water to be optimized to suit the specific application.

The invention can be practiced to produce anodically electrolyzed water for use in many hygiene-sensitive service applications for on-site generation of stable and strong disinfecting solution. Such applications include washing food surfaces, such as poultry products and fresh produce, as well as cleaning food contact surfaces such as food processing equipment, food handling facilities, utensils, and also washing hands in food industries, restaurants, service centers, and homes. The anolyte produced pursuant to the invention also is useful for cleaning other surfaces such as floors, carpets, and shower curtains to reduce cross-contamination in medical/dental services, homes, and nursing care facilities. The invention is also suited for agricultural applications to replace other chemical pesticides and fungicides.

Although some embodiments of the present invention have been described in detail, it should be understood that various changes, substitutions, and alterations can be made hereupon without departing from the principle and scope of the invention. Accordingly, the scope of the present invention should be determined by the following claims and their appropriate legal equivalents.

That claimed is:

1. A method for producing electrolyzed water, the method comprising the steps of:
   (a) pumping a conductivity enhancing solution into a supply of feed water to create a feed water solution, and flowing the feed water solution into an input portion of an electrochemical cell, the electrochemical cell comprising an anode chamber and a cathode chamber, the anode chamber comprising an anode electrode and the cathode chamber comprising a cathode electrode, anode chamber and cathode chamber being separated by a membrane;
   (b) applying a cell current from a power source to the electrochemical cell;
   (c) sensing the cell current;
   (d) electrolyzing the feed water solution in the electrochemical cell to produce a separate stream of anolyte solution electrolyzed water in the anode chamber and a separate stream of catholyte solution electrolyzed water in the cathode chamber;
   (e) comparing the cell current to a predetermined optimum current setpoint; and
   (f) adjusting the rate at which the conductivity enhancing solution is pumped into the feed water in response to the difference between the cell current and the predetermined optimum current setpoint to maintain the cell current substantially equal to the predetermined optimum current setpoint.

2. The method of claim 1, wherein the conductivity enhancing solution includes a component selected from the group consisting of sodium chloride, hydrochloric acid, potassium chloride, and magnesium chloride.

3. The method of claim 1, further comprising:
   sensing an output pH of the anolyte solution exiting the electrochemical cell;
   comparing the output pH to a preselected pH; and
   mixing a portion of the catholyte solution discharged from the electrochemical cell with a portion of the feed water solution entering the electrochemical cell in response to a difference between the output pH and the preselected pH to maintain the output pH substantially equal to the preselected pH.

4. The method of claim 3, wherein the step of mixing a portion of the catholyte solution comprises pumping said portion of the catholyte solution into the feed water solution at a flow rate in response to the difference between the output pH and the preselected pH.

5. The method of claim 4, wherein the preselected pH is in the range of about 5 to about 6.

6. The method of claim 3 wherein the conductivity enhancing solution comprises sodium chloride, the stream of anolyte electrolyzed water comprise HOC1 and the stream of catholyte electrolyzed water comprises NaOH, and wherein the pH and the concentration of HOC1 in the anolyte electrolyzed water are independently adjustable.

7. The method of claim 1 wherein the conductivity enhancing solution comprises sodium chloride, the stream of anolyte electrolyzed water comprise HOCl and the stream of catholyte electrolyzed water comprises NaOH.

8. A method for producing electrolyzed water, the method comprising the steps of:
   (a) injecting into a supply of feed water an amount of a conductivity enhancing solution to mix with the feed water to create a feed water solution;
   (b) flowing the feed water solution into an input portion of an electrochemical cell, electrolyizing the feed water solution in the electrochemical cell, and discharging a separate stream of acidic water and a separate stream of alkaline water, wherein the electrochemical cell comprises an anode chamber comprising an anode electrode and a cathode chamber comprising a cathode electrode, wherein the anode and cathode chambers are separated by a membrane;
   (c) sensing a cell current in the electrochemical cell; and
   (d) adjusting the amount of the conductivity enhancing solution flowing into the feed water responsive to comparing the cell current with a preselected current to vary the conductivity of the feed water solution to maintain the cell current substantially equal to the preselected current;
   (e) sensing an output pH of the acidic water exiting the electrochemical cell; and
   (f) mixing an amount of the alkaline water exiting the electrochemical cell with the feed water solution entering the electrochemical cell responsive to comparing the output pH with a preselected pH to maintain the output pH substantially equal to the preselected pH.

9. The method of claim 8, wherein the conductivity enhancing solution includes a component selected from the group consisting of: sodium chloride, hydrochloric acid, potassium chloride, and magnesium chloride.

10. The method of claim 8, wherein step (f) comprises diverting a portion of the alkaline water exiting the electrochemical cell to a blend pump which has an output in communication with the feed water solution, and controlling the speed of the blend pump in response to the comparison of the preselected pH to the output pH.

11. The method of claim 8, wherein
step (a) comprises pumping the conductivity enhancing solution with an injection pump into the stream of feed water; and
step (d) comprises varying the speed of the injection pump in response to the comparison of the preselected cell current and the sensed cell current.

12. The method of claim 8 wherein the conductivity enhancing solution comprises sodium chloride, and the active chlorine concentration of the acidic water is constant at a pH value between about 5 and about 6.

13. An apparatus for producing electrolyzed water, the apparatus comprising:
an electrochemical cell having an input portion and an output portion, the electrochemical cell having first and second chambers separated by a membrane defining an anode chamber and a cathode chamber, said anode chamber having an anode electrode for electrolyzing a feed water solution and an outlet for producing an anolyte stream and said cathode chamber having a cathode electrode for electrolyzing the feed water to produce an alkaline catholyte and having an outlet for producing a catholyte stream;
a solution reservoir containing a conductivity enhancing solution and having an outlet;
a mixing chamber having an inlet in fluid communication with a supply of feed water;
a first pump having an input end in fluid communication with the outlet of the solution reservoir and an output end in fluid communication with the mixing chamber for mixing the conductivity solution with the feed water to create a feed water solution, the mixing chamber having an outlet in fluid communication with the chambers of the electrochemical cell;
an anolyte discharge conduit for discharging the anolyte stream;
a catholyte discharge conduit for discharging a catholyte stream;
a current feedback sensor to sense a cell current in the electrochemical cell; and
a current control unit in data communication with the current feedback sensor and the first pump, wherein the current control unit includes a feedback component that compares the cell current with a preselected current and adjusts the amount of conductivity enhancing solution flowing from the first pump into the mixing chamber responsive to the comparison between the cell current with the preselected current to maintain the cell current substantially equal to the preselected current.

14. The apparatus of claim 13, further comprising a power supply unit that supplies the electric current to the electrochemical cell, and wherein the current feedback sensor is positioned between the power supply unit and the electrochemical cell.

15. The apparatus of claim 13, wherein the conductivity enhancing solution includes a component selected from the group consisting of: sodium chloride, hydrochloric acid, potassium chloride, and magnesium chloride.

16. The apparatus of claim 13, further comprising:
a second pump having an input end in fluid communication with a catholyte solution exiting the output portion of the electrochemical cell and an output end in fluid communication with the mixing chamber;
a pH feedback sensor to sense an output pH of an amount of solution exiting the electrochemical cell; and
a pH control unit in data communication with the pH feedback sensor and the second pump, wherein the pH control unit compares the output pH with a preselected pH and adjusts a flow rate of the second pump responsive to the comparison of the output pH with the preselected pH to maintain the output pH substantially equal to the preselected pH.

17. The apparatus of claim 13, wherein the preselected pH is greater than about 5.

18. The apparatus of claim 13, wherein the preselected pH is in the range of about 5 to about 6.

\* \* \* \* \*